(12) United States Patent
Duan et al.

(10) Patent No.: US 10,362,260 B2
(45) Date of Patent: Jul. 23, 2019

(54) SYSTEM AND METHODS FOR DEVICE CONTROL AND MULTIPLE INPUT HANDLING

(71) Applicants: Hisense USA Corp., Suwanee, GA (US); Hisense Electric Co., Ltd., Qingdao, Shandong (CN); Hisense International Co., Ltd., Qingdao, Shandong (CN)

(72) Inventors: Hongtao Duan, Suwanee, GA (US); Xiuyuan Shang, Suwanee, GA (US); Jianchun Zhang, Suwanee, GA (US)

(73) Assignees: HISENSE USA CORP., Suwanee, GA (US); HISENSE ELECTRIC CO., LTD., Qingdao (CN); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 16/121,378

(22) Filed: Sep. 4, 2018

(65) Prior Publication Data
US 2018/0376096 A1  Dec. 27, 2018

Related U.S. Application Data

(63) Continuation of application No. 15/237,440, filed on Aug. 15, 2016, now Pat. No. 10,084,984.

(51) Int. Cl.
*G06F 3/02* (2006.01)
*G06F 3/16* (2006.01)
*H04N 5/44* (2011.01)
*H04N 21/422* (2011.01)

(52) U.S. Cl.
CPC ............. *H04N 5/4403* (2013.01); *G06F 3/02* (2013.01); *G06F 3/165* (2013.01); *H04N 21/42204* (2013.01); *H04N 2005/4417* (2013.01)

(58) Field of Classification Search
CPC ........... H04N 5/4403; H04N 21/42204; H04N 2005/4417; G06F 3/02; G06F 3/165
See application file for complete search history.

(56) References Cited

U.S. PATENT DOCUMENTS

| | | | | |
|---|---|---|---|---|
| 6,225,916 B1* | 5/2001 | Sugimoto | ............... | G08C 19/28 340/12.17 |
| 2012/0256735 A1* | 10/2012 | Gilson | .................. | G08C 19/16 340/12.17 |

* cited by examiner

*Primary Examiner* — Ariel A Balaoing
(74) *Attorney, Agent, or Firm* — Brinks Gilson & Lione

(57) ABSTRACT

The present disclosure relates to device control and multiple input event handling. In one embodiment, a process includes detecting a plurality of input commands for control of a display device, determining a multiple input event based on the plurality of input commands, and determining a multiple input control function for the display device based on the multiple input event. The multiple input control function is determined based on input type of the multiple input event and a function of the input type of the multiple input event. The process can also includes controlling operation of the display device based on the multiple input control function, wherein controlling includes modifying display device operation from a control function associated with the plurality of input commands to a multiple input event control function.

20 Claims, 7 Drawing Sheets

SYSTEM AND METHODS FOR DEVICE CONTROL AND MULTIPLE INPUT HANDLING

CROSS REFERENCE

This application is a continuation application of and claims priority to U.S. application Ser. No. 15/237,440, filed on Aug. 15, 2016, entitled "System and Method for Device Control and Multiple Input handling", which is herein incorporated by reference in its entirety.

TECHNICAL FIELD

The present disclosure relates to display devices, and in particular, processes and configurations for device control and multiple input event handling.

BACKGROUND

Display devices (e.g., TVs) allow for presentation of content to many users. More recently, display devices have been provided additional capabilities with respect to providing content. By way of example, the traditional use of viewing broadcast content from over the air sources and cable providers is only a subset of the functionality provided by display devices today. With added functionality, interaction and control of display devices is important for device operation. There exists a need for improved control and operation of devices due to increase functional ability of display devices.

Typical use of a display device often requires remote control operation due to the distance a viewer is typically displaced from the device. Due to increases in applications and functionality provided to display devices, there is a desire for added control functionality and features which improve the use and performance of a device using remote controls. Accordingly there exists a need for improved and different control for display devices.

BRIEF SUMMARY OF THE EMBODIMENTS

Disclosed and claimed herein are systems, methods and devices for device control and multiple input event handling. In one embodiment, a method includes detecting, by a display device, a plurality of input commands for control of the display device, wherein the plurality of input commands are received by the display device. The method also includes determining, by the display device, a multiple input event based on the plurality of input commands, wherein the multiple input event is determined based on detecting the plurality of input commands received within a predetermined period of time. The method also includes determining, by the display device, a multiple input control function for the display device based on the multiple input event, wherein the multiple input control function is determined based on input type of the multiple input event and a function of the input type of the multiple input event. The method also includes controlling, by the display device, operation of the display device based on the multiple input control function, wherein controlling includes modifying display device operation from a control function associated with the plurality of input commands to a multiple input event control function.

In one embodiment, the plurality of input commands includes a plurality of received commands associated with a plurality of button presses for one or more input buttons of a control unit for the display device.

In one embodiment, the predetermined period of time is a time range of 1 to 5 seconds.

In one embodiment, determining a multiple input event includes detecting a plurality of input commands greater than a predetermined threshold.

In one embodiment, the multiple input control function adjusts a rate for changing volume for the display device.

In one embodiment, the multiple input control function terminates one or more applications presented by the display device.

In one embodiment, the multiple input control function is dispatched by an application manager of the display device to an application executed by the display device.

In one embodiment, controlling operation of the display device includes modifying a rate volume is adjusted in response to a number of the plurality of input commands and application management functions for the display device, wherein the rate volume is adjusted and a time period for adjustment are based on the multiple input control function.

In one embodiment, controlling operation of the display device includes terminating display of an application presented by the display device.

In one embodiment, controlling includes selecting one of a plurality of sources based on the multiple input control function and terminating content display associated with the selecting.

According to another embodiment, a device is provided including a display and a controller configured to control the display. The controller is configured to detect a plurality of input commands for control of the display device, wherein the plurality of input commands are received by the display device, and determine a multiple input event based on the plurality of input commands, wherein the multiple input event is determined based on detecting the plurality of input commands received within a predetermined period of time. The controller is also configured to determine a multiple input control function for the display device based on the multiple input event, wherein the multiple input control function is determined based on input type of the multiple input event and a function of the input type of the multiple input event. The controller is also configured to control operation of the display device based on the multiple input control function, wherein controlling includes modifying display device operation from a control function associated with the plurality of input commands to a multiple input event control function.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
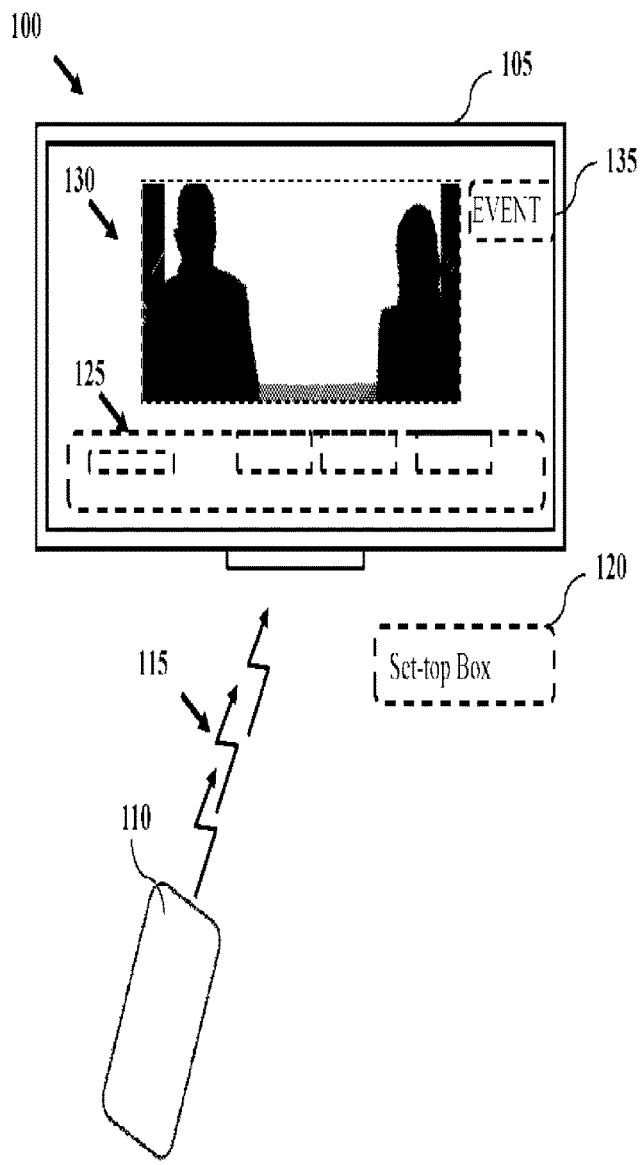
FIG. 1 depicts a simplified system diagram according to one or more embodiments.

One aspect of the disclosure is directed to device control, and in particular, control of a display device (e.g., TV). In one embodiment, display device configurations and processes are provided for operating a display device to allow for detection and handling of multiple input events.

A multiple input event relates to a plurality of input commands received within a predetermined time period. In one embodiment, a multiple input event signals a desire for operation of the display device to handle requests expeditiously. As will be discussed in more detail below, multiple input events can include button presses for one or more buttons of a control device (e.g., remote control). In one embodiment, a multiple input event relates to a panic key event, wherein commands received from the remote control indicate panic of frustration with operation of the device. By way of example, in comparison to generation of multiple commands from accidental pressing of multiple buttons at the same time, a multiple input event may relate more to several key presses trying to exit a program, raise volume, change channel, launch an application, etc.

In one embodiment, processes are provided to determine multiple input events. Detection of a multiple input events may be detected following one or more input commands to device. Multiple input events can include commands associated with presses of a plurality of keys of a control device, such as one or more of volume control, selection (e.g., ok, go, etc.), channel/input control, and a combination thereof. Multiple input events can be detected based on rapid input of keys. In certain embodiments, multiple input events can be detected based on button holds, rapid presses and/or hard presses.

Another aspect of the disclosure is directed to mitigating frustration and/or stress associated with operation of a display device. In one embodiment, device configurations and processes are provided for determining a multiple input control function.

A multiple input control function provides an alternate or different control function for a display device to operate. In one embodiment, the type and/or parameters of the multiple input control function can depend on the multiple input event and allow for adjusting control configurations in response to the multiple input event. In that fashion, a display device can adjust operation based on the input signal type (e.g., key type) such that plurality of responses may be provided to multiple key buttons.

Another aspect is application management on a display device which can be in response to multiple input event. With the ability of display devices to provide network capabilities in addition to broadcast features, added control is desired with respect to sources and applications providing content. In one embodiment, processes and configurations are provided for handling application freezing or delay, application exit, etc. Multiple input events may be configured to overcome latency in loading an application, overcoming a frozen application, and/or eliminating having to power down and restart a display device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a simplified system diagram according to one or more embodiments. System 100 includes display device 105 and controller 110. According to one embodiment, display device 105 is configured to allow for control based on a multiple input event. As such, one or more processes and configurations are provided for detecting a multiple input event, determining operation based on a multiple input event, and controlling operation of display device 105 to improve performance.

According to one embodiment, display device 105 may be configured to detect input commands for control of the display device 105. According to one embodiment, input commands may be provided to display device 105 by way of direct input (e.g., display device buttons, touch screen, etc.) and/or by control device 110. In one embodiment, control device 110 is a remote control. Control device 110 can detect user commands (e.g., key presses, control commands, etc.) and is configured to transmit input commands to display device 105. According to one embodiment, a plurality of commands 115 transmitted by control device 110 are received and characterized by display device 105 to determine if a multiple input event has been received. In one embodiment, display device 105 is configured to determine a multiple input control function for the display device based on the multiple input event. According to another embodiment, display device 105 is configured for operation based on the multiple input control function.

According to another embodiment, display device 105 may be configured to present graphical elements and content from one or more sources. Sources for display device 105 can include input sources, broadcast media input, cable inputs, and applications of the display device. In addition, display device 105 may be configured to handle multiple input events based on the operation of display device 105 with multiple input sources. According to one embodiment, display device 105 may be configured to receive content from an external device, such as optional set top box 120. According to another embodiment, display device 105 may be configured to run one or more applications configured to provide content from a network location. Accordingly, display device 105 may be configured to display content associated with one or more sources. In certain embodiments, content displayed by display device 105 includes video and/or graphical elements associated from more than one source. FIG. 1 includes an exemplary representation of graphical content 125 and image content 130. According to one embodiment, graphical content 125 and image content 130 may be received by one or more sources of display device 105. According to another embodiment, display device 105 may be configured to handle multiple input events associated with one or more of graphical content 125 and image content 130.

According to another embodiment, display device 105 may be configured to display an indicator 135 when a multiple input event is detected and control of the device is modified. In one embodiment, indicator 135 includes one or more of text and graphical images. According to another embodiment, display of indicator 135 can signal the type of command change, and which multiple input event was handled. By way of example, for a multiple input element associated with a control such as a volume change or navigation change, indicator 135 can provide feedback identifying the amount or rate of change. For multiple input events associated with terminating or launching an application, the indicator can identify the multiple input command function that display device will take. According to anther embodiment, indicator may be displayed for a period of time for which the multiple input control command is being performed. In that fashion, when display device 105 completes the modified function, or reverts to a control function, the display device will remove indicator 135 from display.

In one embodiment, display device 105 is tuned/set to a source where control commands and inputs 115 are directed to a single source, such as a display device input. In another embodiment, source and content may be presented on display device 105 by multiple sources. As such, input commands may be detected to select which source to apply. Multiple input command functions may be determined for one or more sources or graphical elements on display. By way of example, volume and input commands may be directed to display device 105 and channel and navigation guide commands may be associated with set top box 120. Alternatively, some commands for display device 105 are for displayed broadcast content and some commands for graphical elements displayed by other content sources of display device.

As will be discussed in more detail below, display device 105 may be configured such that multiple input commands can be generated by multiple key presses. In addition, display device 105 is configured to determine a command features from input commands 115. In an exemplary embodiment, the more key presses associated with plurality of commands 115 the greater change display device may initiate. In another embodiment, multiple input commands can be generated by holding a button for a period of time in addition and/or separate from plurality of commands 115.

Figure 2:
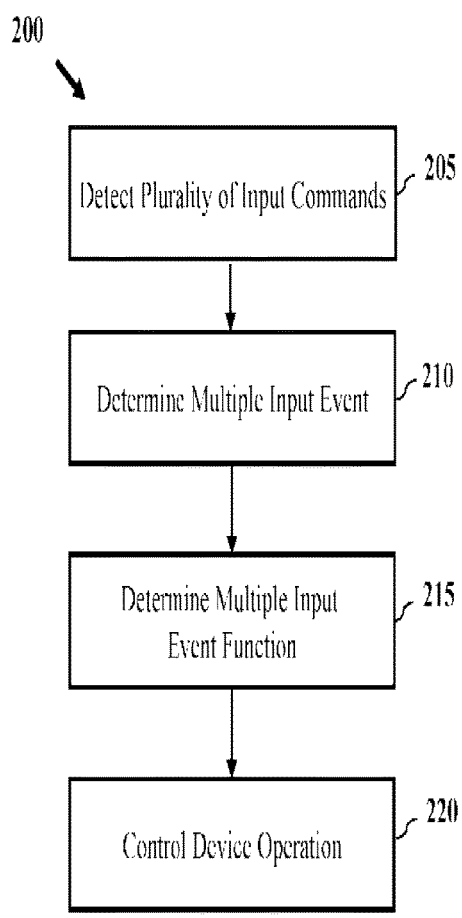
FIG. 2 depicts a process for device control according to one or more embodiments.

FIG. 2 depicts a process for device control and multiple input event handling according to one or more embodiments. According to one embodiment, process 200 may be employed by a display device (e.g., display device 105) for detection and control based on multiple input events. Process 200 may be initiated by detecting a plurality of input commands for control of the display device at block 205. In one embodiment, a plurality of input commands (e.g., plurality of commands 115) are received by the display device at block 205. In one embodiment, the plurality of input commands received at block 205 include a plurality of received commands associated with a plurality of button presses for one or more input buttons of a control unit for the display device. In certain embodiments, the plurality of input commands received at block 205 relate to commands transmitted from a control device as opposed to input commands relative to buttons on the display device.

At block 210, process 200 includes determining a multiple input event based on the plurality of input commands. In one embodiment, the multiple input event is determined based on detecting the plurality of input commands received within a predetermined period of time. According to another embodiment, input commands associated with block 205 relate to a predetermined time period, such as a time range of 1 to 5 seconds. In one embodiment, detecting plurality of input commands received at block 205 within a predetermined time period signals that commands are not directed to normal transmittal of commands. According to another embodiment, the amount of time and determination can also account for past behavior (e.g., history of button use) and/or type of button press. In certain embodiments, a multiple input event may not be determined for rapid commands associated with navigation of a guide, whereas a similar pattern of button pressed to launch or exit an application will be considered a multiple input event. In other embodiments, rapid guide commands may signal a multiple input event.

According to another embodiment, determining a multiple input event at block 210 includes detecting a plurality of input commands greater than a predetermined threshold. In one embodiment, the predetermined threshold may be set at 5 button presses. However, a display device may be configured to operate with different predetermined threshold values.

In one embodiment, a multiple input event is detected at block 210 based on commands associated with particular keys of a control device, such as one or more of a volume change, selection (e.g., OK), launching, exiting, and a combination thereof. In other embodiments, rapid selection of any button or element on a control device may be considered a multiple input event by the display device. When multiple key types are pressed, the display device may also determine which key has the highest probability as will be discussed in more detail with respect to FIGS. 5A-5B. In an exemplary embodiment, a multiple input event at block 210 may be based on repeated activation of a volume, exit or launch key.

At block 215, process 200 includes determining a multiple input control function for the display device based on the multiple input event. In one embodiment, the multiple input control function is determined at block 215 based on input type of the multiple input event and a function of the input type of the multiple input event. By way of example, a multiple input event generated by repeated activation of a volume key may correspond to a multiple input control function for adjusting the rate volume is changed. Similarly, a multiple input control function for an exit or launch key may override display device operation to exit or launch an application. As such, a multiple input control function may be based on the input key. In an exemplary embodiment, the multiple input control function adjusts a rate for changing volume for the display device. In another exemplary embodiment, the multiple input control function terminates one or more applications presented by the display device. According to another embodiment, the multiple input control function is dispatched by an application manager of the display device to an application executed by the display device.

At block 220, process 200 includes controlling operation of the display device based on the multiple input control function. Controlling includes modifying display device operation from a control function associated with the plurality of input commands to a multiple input event control function. In one embodiment, controlling operation of the display device includes modifying a rate volume is adjusted in response to a number of the plurality of input commands and application management functions for the display device, wherein the rate volume is adjusted and a time period for adjustment are based on the multiple input control function.

In one embodiment, controlling operation of the display device at block 220 includes terminating display of an application presented by the display device. According to another embodiment, controlling includes selecting one of a plurality of sources based on the multiple input control function and terminating content display associated with the selecting.

In one embodiment, controlling operation of the display device at block 220 includes presenting a graphical element to a multiple input event and/or multiple input control function. The message (e.g., message 135) can be presented with one or more graphical elements such as a message or graphic to signify the multiple input control function. In certain embodiments, the message can include the type of event and/or how the function is being changed. Control at block 220 can include removal of the message from display following the operation.

Figure 3:
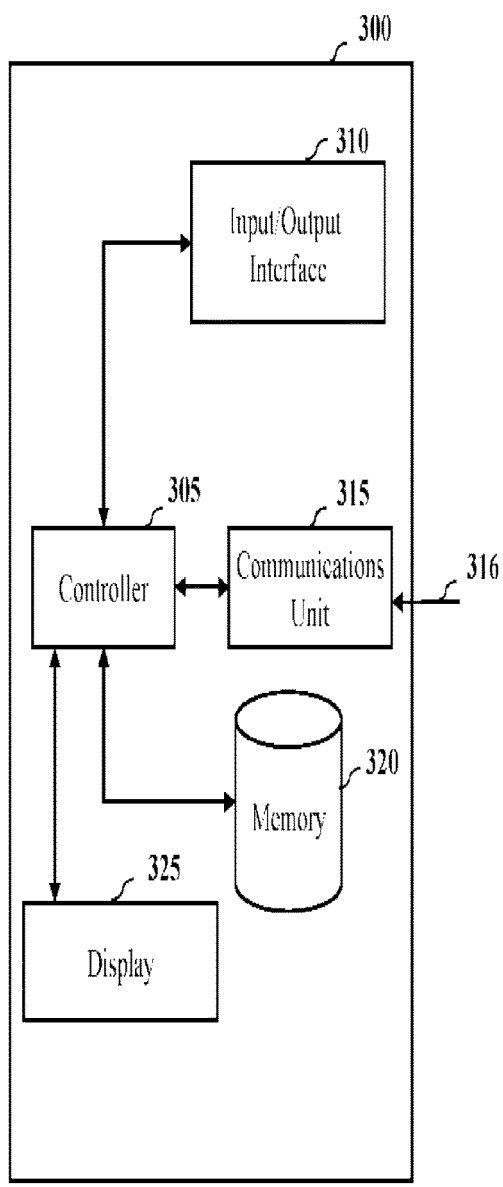
FIG. 3 depicts a graphical representation of a device according to one or more embodiments.

FIG. 3 depicts a graphical representation of a device according to one or more embodiments. According to one embodiment, device 300 is configured to detect a multiple input event and control operation for a display device. According to one embodiment, FIG. 3 depicts a representation of elements of device 100 of FIG. 1 according to one or more embodiments.

Device 300 includes controller 305, input/output (I/O) interface 310, communications unit 315, memory 320 and display 325. Controller 305 may communicate with each of user interface 310, communications unit 315, memory 320 and display 325 by way of one or more communication links within device 300.

Device 300 includes controller 305 configured to control display 325. According to certain embodiments, controller 305 may be configured to detect a command to launch an image capture functionality of the device. The command can include contact to display 312. In response, controller 305 can control display of an overlay window on display 312 in response to the command. Controller 305 is also configured to detect a capture command for image capture by the device 300. The capture command can relate to detection of a release of the contact to the display 312. Controller 305 controls capture of image data in response to the capture commands.

Controller 305 may be configured to execute code stored in memory 320 for operation of device 300 including presentation of a graphical user interface and control based on a multiple input event. Controller 305 may include a processor and/or one or more processing elements. In one embodiment controller 305 may be include one or more of hardware, software, firmware and/or processing components in general. According to one embodiment, controller 305 may be configured to perform one or more processes described herein.

Input/output (I/O) interface 310 may allow for operation of device 300. According to one embodiment, commands to device 300 may be detected by input/output interface 310. Device 300 includes display 312 configured for presentation of a user interface and overlay windows. User interface 310 may be configured to receive one or more commands via an input/output (I/O) interface 311 which may include one or more inputs or terminals to receive user commands.

Communications unit 315 may be configured to allow for transmission and reception of data relative to device 300. Communications unit 315 may be configured for wired and/or wireless communication with one or more network elements, such as servers. In one embodiment, communications unit 315 is configured to receive input 316 from a control device, which can include a plurality of inputs (e.g., plurality of inputs 115) associated with a multiple input event. Input 316 may relate to network input, infrared (IR), short range wireless, etc.

Memory 320 may be configured to store data captured by device 300 and to store instructions for operation of device 300. Memory 320 may include non-transitory RAM and/or ROM memory for storing executable instructions, operating instructions and content for display.

Figure 4A:
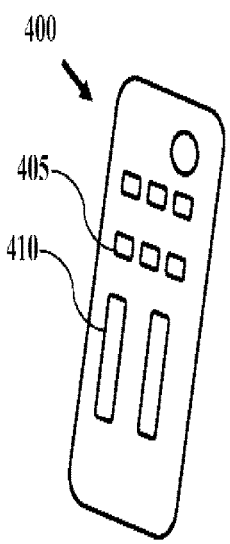
FIGS. 4A-4B depict graphical representations of control devices according to one or more other embodiments.
Figure 4B:
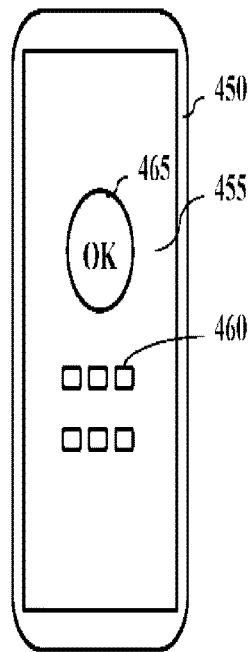

FIGS. 4A-4B depict graphical representations of control devices according to one or more other embodiments. Referring first to FIG. 4A, control device 400 (e.g., control device 110) is shown according to one embodiment. In an exemplary embodiment, control device 400 is a remote control device configured to transmit control signals wirelessly based on activation of one or more buttons shown as 405, 410. According to one embodiment, button 405 and button 410 each relate to a push button for control of a display device (e.g., display device 105). According to another embodiment, button 405 and button 410 each include provide a different control feature. For example, button 405 may be configured to provide a selection or navigation feature and button 410 may be for controlling a volume output of a display device. According to one embodiment, a multiple input event can be detected based on multiple button pressed of control device 400, such as multiple button presses of button 405, multiple button presses of button 410 and/or multiple button presses of a combination of buttons (e.g., buttons 405 and 410). According to another embodiment, a multiple input control function may be determined based on input commands generated from pressed of button 405 and button 410.

According to one embodiment, buttons 405 and button 410 may relate to physical buttons of control device 400. In certain embodiments, control device 400 may be configured to transmit a signal, or plurality of signals (e.g., plurality of commands 115) in response to each press of a button, or plurality of presses.

Referring to FIG. 4B, control device 450 (e.g., control device 110) is shown according to another embodiment. Control device 450 may operate similar to control device 400. According to one embodiment, control device 450 includes a display 455 configured to present selectable graphical element 460 and 455 that may be pressed or selected to generate input commands (e.g., plurality of commands 115) for a display device. In an exemplary embodiment, control device 400 is configured to present a graphical user inter face (GUI) or application and transmit control signals wirelessly based on activation of one or more buttons shown as 460, 465. According to one embodiment, button 460 and button 465 each relates to a push button for control of a display device (e.g., display device 105). According to another embodiment, button 460 and button 465 each include provide a different control feature. In one embodiment, button 460 may be configured to provide a selection or navigation feature and button 465 may be for controlling a volume output of a display device. According to one embodiment, a multiple input event can be detected based on multiple button pressed of control device 400, such as multiple button presses of button 460, multiple button presses of button 465 and/or multiple button presses of a combination of buttons (e.g., buttons 460 and 465). According to another embodiment, a multiple input control function may be determined based on input commands generated from pressed of button 460 and button 465.

According to one embodiment, buttons 460 and button 465 may relate to soft buttons of control device 450. In certain embodiments, control device 450 may be configured to transmit a signal, or plurality of signals (e.g., plurality of commands 115) in response to each press of a button, or plurality of presses.

Figure 5A:
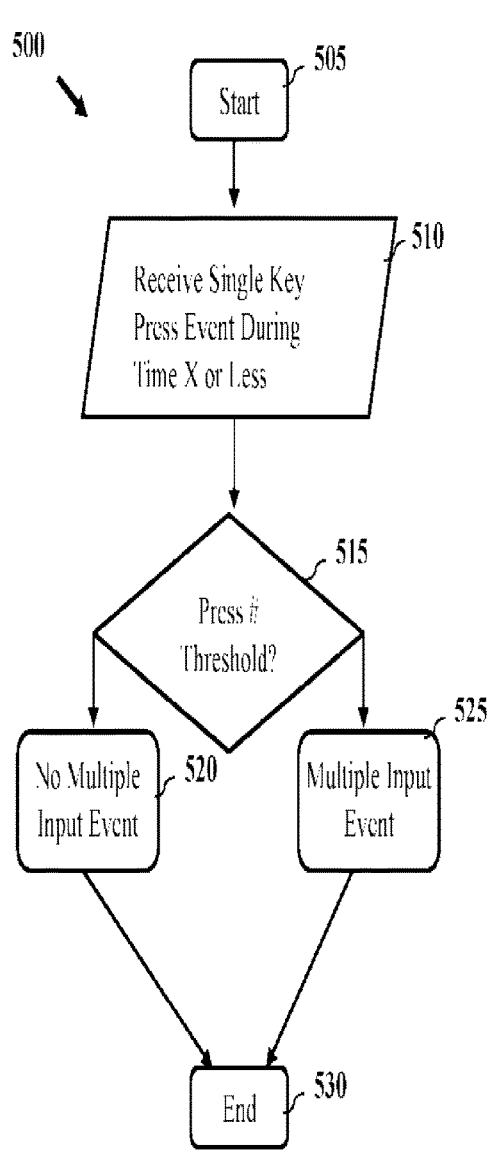
FIGS. 5A-5B depict graphical representations of processes for determining key judgments according to one or more embodiments.
Figure 5B:
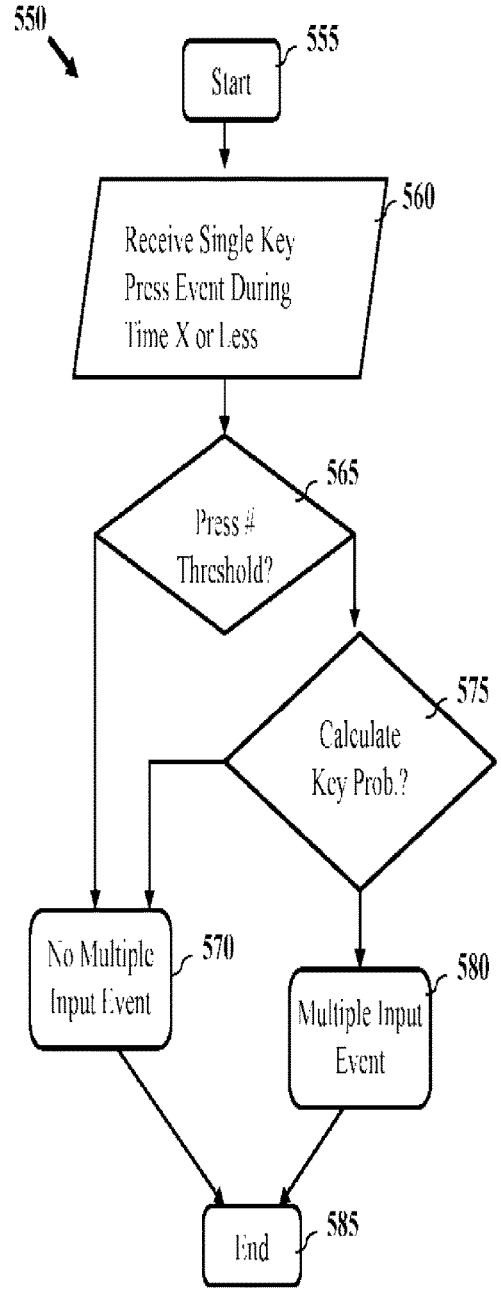

FIGS. 5A-5B depict graphical representations processes for determining key judgments according to one or more embodiments. According to one embodiment, a display device (e.g., display device 105) may be configured to receive many input signals. According to another embodiment, the display device may be configured to determine if a multiple input event has been transmitted to the display device. FIGS. 5A-5B depict processes for determining a multiple input event. Process 500 of FIG. 5A and 550 of 5B may each be performed by a controller of a display device and/or one or more display device modules, such as a key manager module.

Process 500 of FIG. 5A may be employed to characterize input commands for determining a multiple input event. Process 500 may be initiated at start block 505. Input commands are received at block 510 by a display device. In one embodiment, input commands received at block 510 include a plurality of times for a key of a control device. In one embodiment, process 500 analyzes key presses received at block 510 when key presses exceed a threshold. In one embodiment, a multiple input event for a particular key relates to a threshold number of 5. When the input commands exceed the threshold at block 510, process 500 determines whether the key presses exceed the threshold during a predetermined time (e.g., time X) or less at block 515. The predetermined time for key presses to exceed a threshold may be on the range of 3-6 seconds according to one embodiment. Other time ranges may be employed. Process 500 determines that no multiple input events have occurred at block 520 when the threshold number of key presses does not occur within the predetermined time period at block 515. A multiple input event may be determined at block 525 when the threshold number of key presses are received within the predetermined time period. Process 500 terminates at block 530. According to one embodiment, process 500 allows for user behavior to be analyzed. In certain embodiments, a controller of a display device may store the occurrence of non-multiple input events determined at block 520 and multiple input events determined at block 525. The occurrence of multiple input events, non-occurrence, rate of occurrence, and other metrics may be stored and utilized by a controller to determine a multiple input event.

Process 550 of FIG. 5B may be employed to characterize input commands for determining a multiple input event. Process 550 may be initiated at start block 555. Input commands are received at block 560 by a display device. In one embodiment, input commands received at block 560 include a plurality of times for a plurality of keys of a control device. In one embodiment, multiple key presses receive at block 560 can include a plurality of key presses associated with more than one key, as such as five (5) total key presses from buttons 405 and 410 combined. Detecting and handling multiple buttons allows a display device to better address user scenarios. With respect to handling and inferring user commands associated with quick handling or frustration, multiple buttons may be activated on a control device. By way of example, when a user desires to exit an application, the user may repeatedly press the exit key and press a menu key on a remote. Process 550 may analyze the number of key presses and determine a multiple input control function based on the key with the highest probability associated with a desired control command.

In one embodiment, process 550 analyzes key presses received at block 560 when key presses exceed a threshold. In one embodiment, a multiple input event for a particular key relates to five (5) key presses. When the input commands exceed the threshold at block 560, process 550 determines whether the key presses exceed the threshold during a predetermined time (e.g., time X) or less at block 565. Process 550 determines that no multiple input events have occurred at block 570 when the number of key presses does not occur within the predetermined time period at block 565. When the input commands are within the time threshold at block 565, process 550 determines the probability of each key at block 575.

In one embodiment, the probability may be assigned based on one or more factors at block 575. A primary factor for assigning probability at block 575 may include the number of key presses. By way of example, input commands including five (5) exit key presses and two (2) menu key presses can result in process 550 assigning the exit key with a higher probability. Key probability at block 575 may be assigned based on the particular input or function displayed by a display device. In that fashion, the controller may be configured to determine probability based on the number of input commands associated with a key and relevance to a current presentation format. The probability determination at block 575 allows for the controller to estimate the key for a multiple input event. When a key cannot be identified at block 575, process 550 determines that no multiple input events have occurred at block 570. Alternatively or in combination, when the plurality of input commands includes multiple key presses within a predetermined threshold that are associated with normal operation of the display device, the controller may determine at block 575 that no multiple input event has occurred. For example, a user may adjust the volume, change channels (one or more times) and activate a guide button multiple times within a predetermined time period. As such, process 550 may determine in some instances that a multiple input event has not occurred. Determinations at block 575 may be based on user behavior and data stored by a controller on determinations for multiple input events. At block 575, process 550 determines a multiple input event based on probabilities determined at block 575.

According to one embodiment, processes 500 and 550 may be employed by a display device (e.g., display device 105) for detection and control based on multiple input events.

Figure 6:
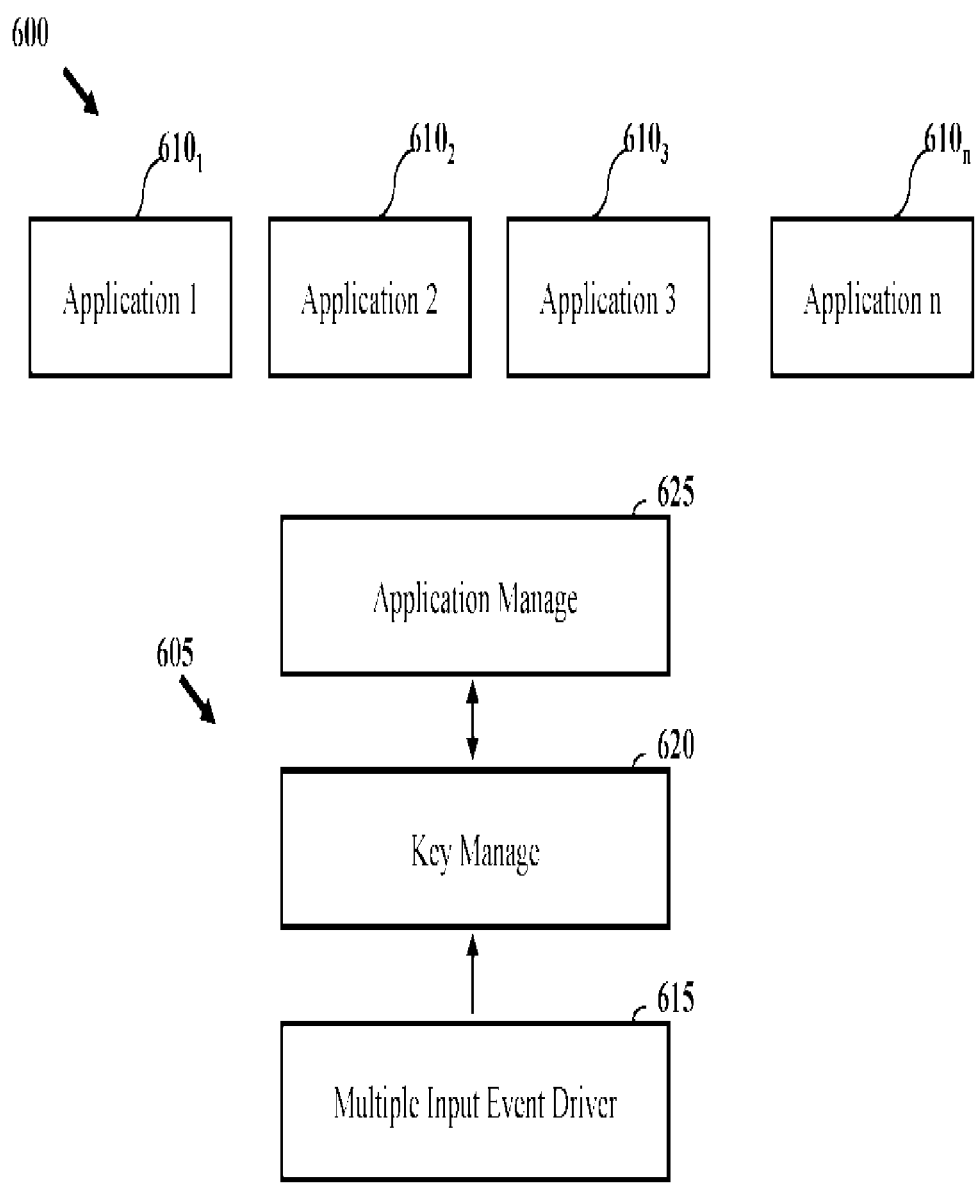
FIG. 6 depicts a graphical representation of display device operation according to one or more embodiments.

FIG. 6 depicts a graphical representation of display device operation according to one or more embodiments. According to one embodiment, operation of a display device (e.g., display device 105, display device 300, etc.) may include a plurality of display device functions 600. Display device functions 600 may relate to layers or modules for operation by a display device. According to one embodiment, a controller of a display device includes modules 605 (e.g., functional units) of the display device and one or more applications $610_{1-n}$ executed by the display device. According to one embodiment, multiple input event driver 615 is configured to detect input commands to the display device and determine a multiple input event. According to another embodiment, the multiple input event driver module 615 may signal a multiple input event to Key Manage module 620. Key Manage module 620 is configured to determine a multiple input control event based on the multiple input event driver module 615. Application manage module is configured to receive the multiple input control function to the particular application for which the command is directed. In one embodiment, application manager module 625 selects one or more of applications $610_{1-n}$ to operate based on the application manage module 625.

Figure 7:
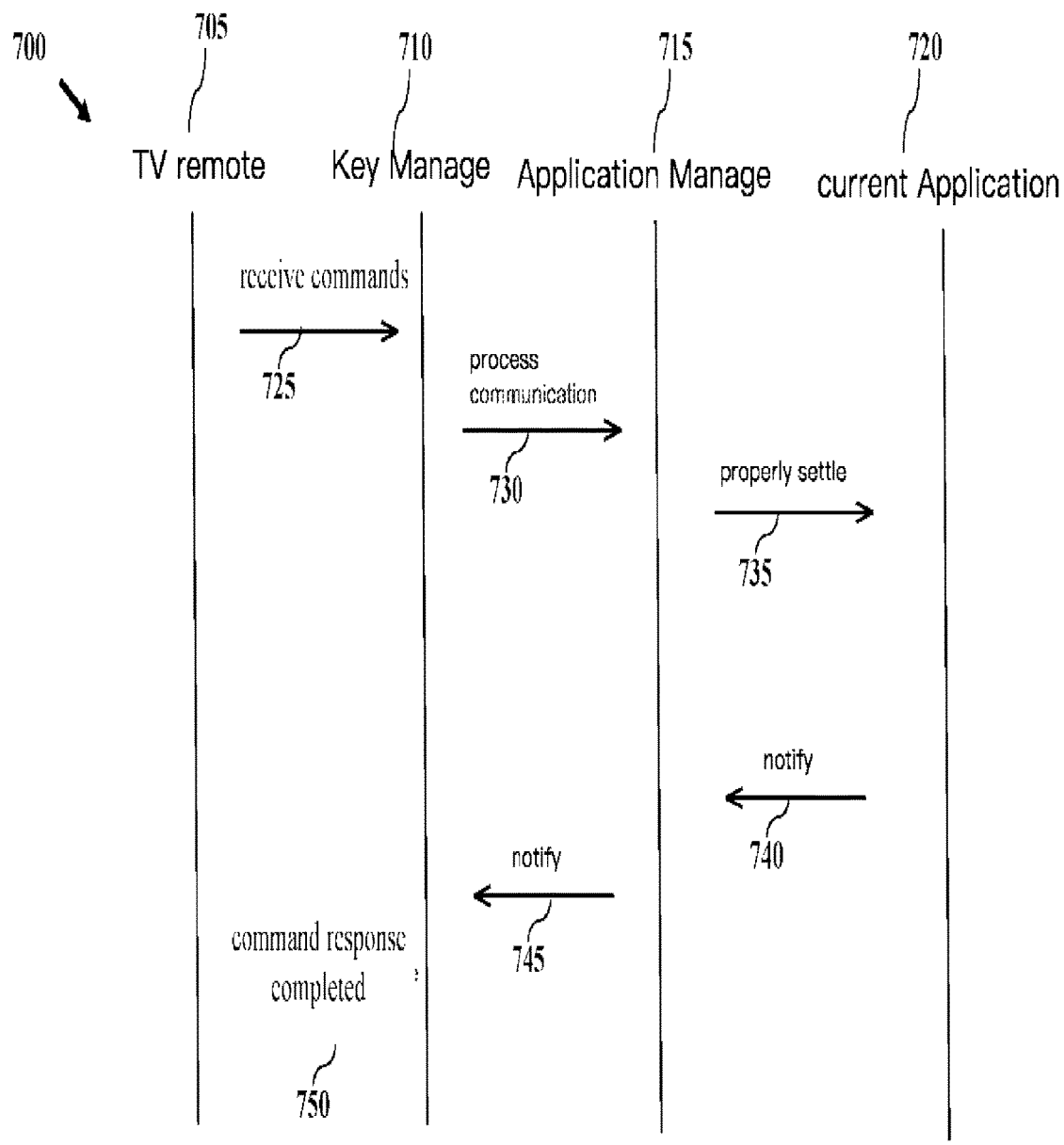
FIG. 7 depicts a graphical representation of responding to multiple input events according to one or more embodiments.

FIG. 7 depicts a graphical representation of responding to multiple input events according to one or more embodiments. According to one embodiment process 700 depicts TV remote 705, key manage module 710, application Manage Module 715 and a current application 720. According to one embodiment, a TV remote 705 generates commands. Key Manage 710 receives the commands and based on a multiple input event transmits multiple input control command 730 to application manage 715 which communicates (735) with a current application 720. Based on completion of the request, the current application will transmit notification 740 to application manage 715. Application manage will notify Key manage 710 and the command response is completed at 750.

Figure 8:
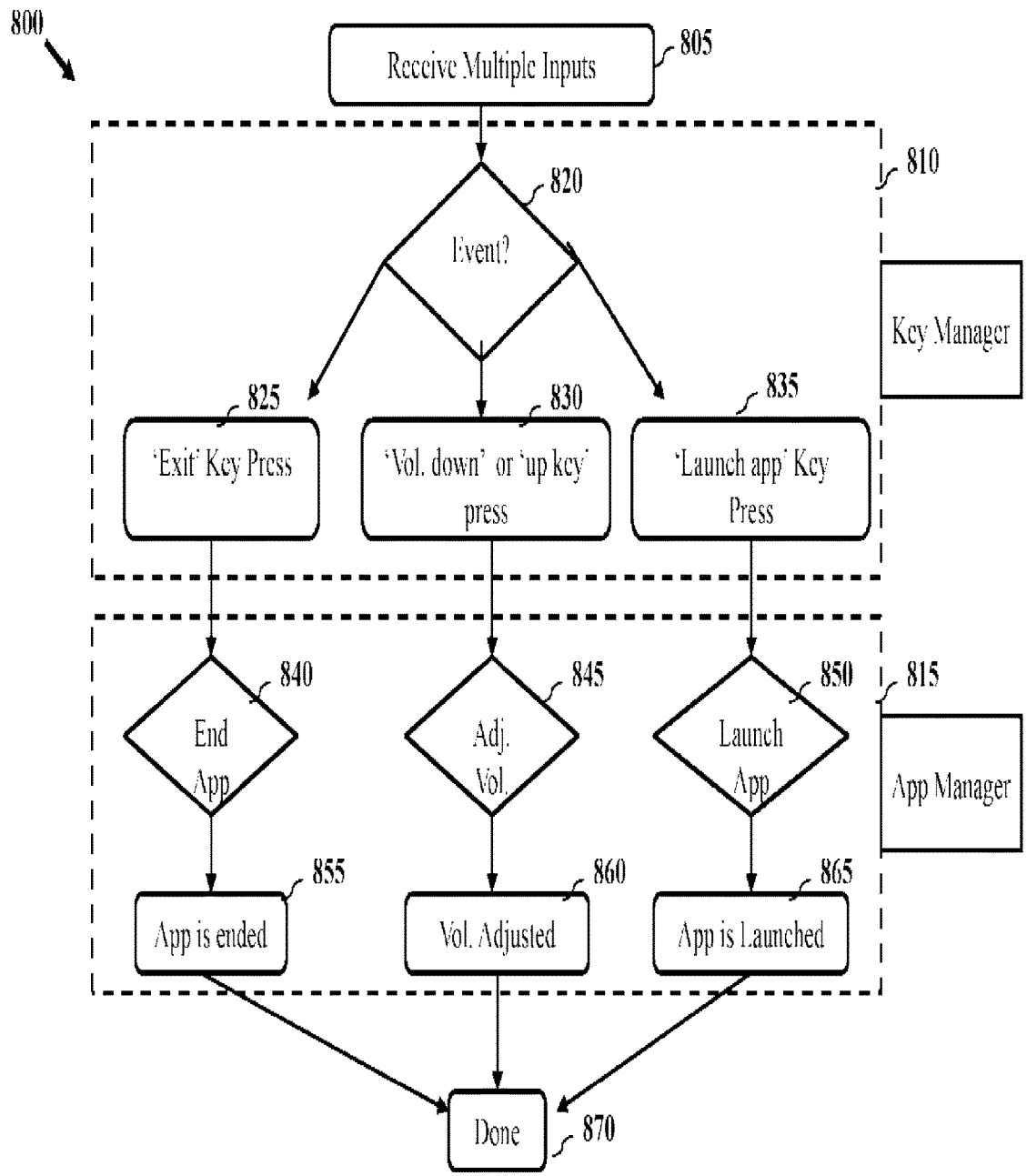
FIG. 8 depicts a graphical representation of multiple input event handling according to one or more embodiments.

FIG. 8 depicts a graphical representation of multiple input event handling according to one or more embodiments. According to one embodiment, process 800 is directed to operation of a display device in response to receiving input commands. Process 800 may be initiated by receiving multiple input commands at block 805. According to one embodiment, a key manage module of the display device and application manage module of the display device may be configured to handle input commands. In one embodiment, key manage module 810 determines if a multiple input event at block 820 based on the multiple inputs received at block 805. In one embodiment, determining a multiple input event at block 820 includes identification of the button/key pressed. Based on the identified key, or estimates key, key manage 810 can handle response. In one embodiment key manager 810 matches a multiple input event to a particular button or key of the control device. Based on the identified button or key, key manager 810 will output instructions to application manager 815. At block 825, exit key commands may be passed to determination block 840 of application manger 815. At block 825, exit key commands may be passed to determination block 840 of application manger 815. At block 825, exit key commands may be passed to determination block 840 of application manger 815.

Application manager module 815 may be configured to route and/or handle multiple input control functions relative to one or more applications. In one embodiment, application manager 815 handles multiple input events relative to active or running applications. In other embodiments, application manager 815 process multiple input events to determine multiple input control function and provide the multiple input control function to one or more applications. Each application may be configured to process and/or respond to the multiple input control function. Exemplary operations by application manager 815 according to one or more embodiments include application manager 815 providing an end application command at block 840 and terminating the application at block 855, providing a volume adjust command at block 845 and adjusting volume at block 860 and providing a launch application command at block 850 and launching the application at block 865. Process 800 is completed at block 870.

Figure 9:
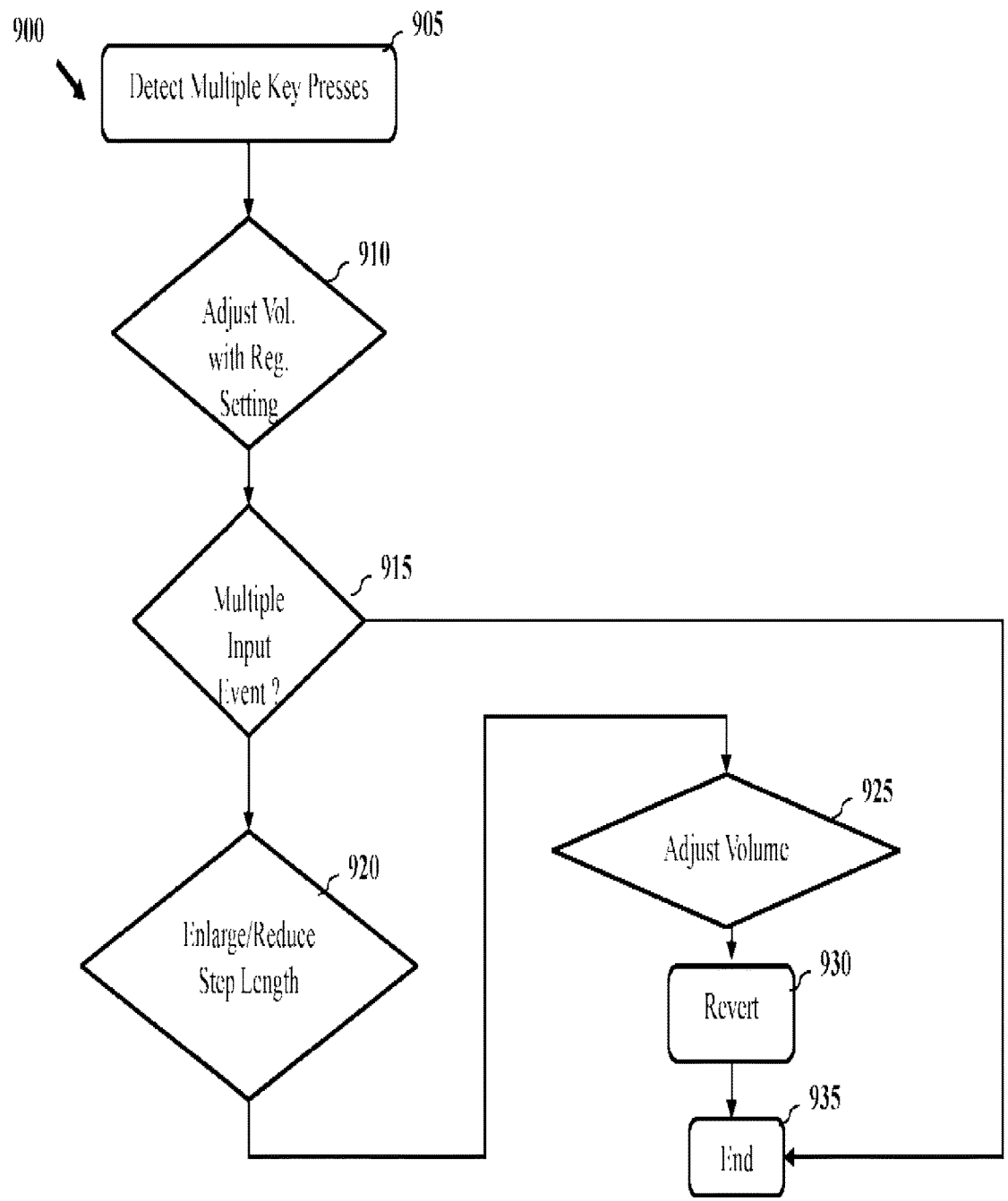
FIG. 9 depicts a graphical representation of a multiple input control response according to one or more embodiments.

FIG. 9 depicts a graphical representation of a multiple input control response according to one or more embodiment. According to one embodiment, a display device may be configured to adjust control settings of a device based on one or more of a multiple input event and multiple input control function. In certain embodiments, multiple input control functions are passed to an application to handle an operation. In other embodiments, the multiple input control operation modifies a control function of the display device. Process 900 is described with reference to a volume key. However, it should be appreciated that the process may be applied to other keys, such as a channel change key, navigation key, directional key, etc. Process 900 is initiated at block 905 when multiple key presses (e.g., volume commands) are detected. At block 910, process 900 adjusts display device volume based on a control function of the display device. For example, the display device may adjust the volume with an increment for each key press. At block 915, process 900 may determine whether a multiple input command has been received based on input received at block 900. When a multiple input commands is not determined at block 910, process 900 terminates at block 935. However, when a multiple input commands is determined at block 910, process 900 checks to modify the control function at block 920. At block 925 process 900 includes controlling the display device and the amount volume is adjusted based on the multiple input control function which modifies the amount volume is adjusted by rate of change. Following adjustment based on the multiple input control function at block 925, process 930 reverts to the control settings of the display device at block 930. At block 935, process 900 ends.

While this disclosure has been particularly shown and described with references to exemplary embodiments thereof, it will be understood by those skilled in the art that various changes in form and details may be made therein without departing from the scope of the claimed embodiments.

What is claimed is:

1. An electronic system, comprising:
   a controller device, comprising:
      a plurality of keys each associated with one of a plurality of control signals corresponding to a first set of control functions; and
      a first communication interface configured to transmit a control signal among the plurality of control signals when a corresponding key among the plurality of keys is activated; and
   an electronic device, comprising:
      a second communication interface for monitoring and receiving one or more control signals associated with the plurality of keys from the first communication interface of the controller device within a predetermined time period;
      a processing circuit configured to:
         recognize any one of a plurality of patterns in the one or more control signals received by the second communication interface within the predetermined time period;
         execute a predefined second control function for the electronic device upon recognizing any one of the plurality of patterns, wherein the predefined second control function differs from any one of the first set of control functions; and execute a control function for the electronic device among the first set of control functions and associated with the one or more control signals received within the predetermined time period when none of the plurality of patterns is recognized.

2. The electronic system of claim 1, wherein the controller device comprises a remote control unit communicating wirelessly with the electronic device.

3. The electronic system of claim 1, wherein the one or more control signals generated by the controller device as a result of repetitive pressing of a single key among the plurality of keys.

4. The electronic system of claim 1, wherein the plurality of patterns recognized by the processing circuit of the electronic device indicate a panic or frustration mode in which a user intends to exit an application running in the electronic device.

5. The electronic system of claim 4, wherein the predefined second control function comprises exiting the application running in the electronic device.

6. The electronic system of claim 1, wherein the plurality of patterns and correspondence between the predefined second control function and the plurality of patterns are determined based on historical key press habits recorded by the electronic device.

7. The electronic system of claim 1, where the plurality of keys comprises a set of physical keys.

8. The electronic system of claim 1, wherein the plurality of keys comprises a set of soft keys displayed on a touch screen of the controller device.

9. The electronic system of claim 1, wherein the predefined second control function is modified from one of the first set of control functions by modifying a control parameter associated with the one of the first set of control functions.

10. An electronic device, comprising:
a communication interface for monitoring and receiving, within a predetermined time period, one or more control signals from a controller device among a plurality of control signals each associated with one of a plurality of keys on the controller device, wherein the plurality of control signals correspond to a first set of control functions for the electronic device; and
a processing circuit configured to:
recognize any one of a plurality of patterns in the one or more control signals associated with the plurality of keys received by the communication interface within the predetermined time period;
execute a predefined second control function for the electronic device upon recognizing any one of the plurality of pattern, wherein the predefined second control function differs from any one of the first set of control functions; and
execute a control function for the electronic device among the first set of control functions and associated with the one or more control signals received within the predetermined time period when none of the plurality of patterns is recognized.

11. The electronic system of claim 10, wherein the plurality of patterns recognized by the processing circuit of the electronic device indicate a panic or frustration mode in which a user intends to exit an application running in the electronic device.

12. An method for controlling an electronic device, comprising:
monitoring and receiving, by a communication interface of the electronic device, within a predetermined time period, one or more control signals from a controller device among a plurality of control signals each associated with one of a plurality of keys on the controller device, wherein the plurality of control signals correspond to a first set of control functions for the electronic device;
recognizing, by a processing circuit of the electronic device, any one of a plurality of patterns in the one or more control signals received by the communication interface within the predetermined time period;
executing, by the processing circuit of the electronic device, a predefined second control function for the electronic device upon recognizing any one of the plurality of patterns, wherein the predefined second control function differs from any one of the first set of control functions; and
executing, by the processing circuit of the electronic device, a control function for the electronic device among the first set of control functions and associated with the one or more control signals received within the predetermined time period when none of the plurality of patterns is recognized.

13. The method of claim 12, wherein the controller device comprises a remote control unit communicating wirelessly with the electronic device.

14. The method of claim 12, wherein the one or more control signals generated by the controller device as a result of repetitive pressing of a single key among the plurality of keys.

15. The method of claim 12, wherein the plurality of patterns recognized by the processing circuit of the electronic device indicate a panic or frustration mode in which a user intends to exit an application running in the electronic device.

16. The method of claim 15, wherein the predefined second control function comprises exiting the application running in the electronic device.

17. The method of claim 12, wherein the plurality of patterns and correspondence between the predefined second control function and the plurality of patterns are determined based on historical key press habits recorded by the electronic device.

18. The method of claim 12, where the plurality of keys comprises a set of physical keys.

19. The method of claim 12, wherein the plurality of keys comprises a set of soft keys displayed on a touch screen of the controller device.

20. The method of claim 12, wherein the predefined second control function is modified from one of the first set of control functions by modifying a control parameter associated with the one of the first set of control functions.

* * * * *